June 13, 1950 E. LOHSE 2,511,727

AUTOMATIC SWITCH POSITIONING DEVICE

Filed Sept. 13, 1947 4 Sheets-Sheet 1

INVENTOR.
Edward Lohse,
BY
Edward L. Mueller
ATTORNEY

June 13, 1950 E. LOHSE 2,511,727

AUTOMATIC SWITCH POSITIONING DEVICE

Filed Sept. 13, 1947 4 Sheets-Sheet 2

INVENTOR.
Edward Lohse,
BY
Edward L. Mueller
ATTORNEY

June 13, 1950 E. LOHSE 2,511,727

AUTOMATIC SWITCH POSITIONING DEVICE

Filed Sept. 13, 1947 4 Sheets-Sheet 3

INVENTOR.
Edward Lohse,
BY
Edward L. Mueller
ATTORNEY

June 13, 1950 E. LOHSE 2,511,727

AUTOMATIC SWITCH POSITIONING DEVICE

Filed Sept. 13, 1947 4 Sheets-Sheet 4

INVENTOR.
Edward Lohse,
BY
Edward L. Mueller
ATTORNEY

Patented June 13, 1950

2,511,727

UNITED STATES PATENT OFFICE 2,511,727

AUTOMATIC SWITCH POSITIONING DEVICE

Edward Lohse, Brooklyn, N. Y., assignor to Control Instrument Company, Inc., Brooklyn, N. Y., a corporation of New York Application September 13, 1947, Serial No. 773,834

3 Claims. (Cl. 318—33)

This invention relates to improvements in switchboard control apparatus, and more particularly to means for motorizing rotary selector switches to permit the rapid and positive selection of the desired switch function remotely.

It is usually most convenient, where a multiplicity of circuits are involved, to locate the controlling switchboard centrally or to have all circuits terminate at one board so that required interconnections may be conveniently made. At the same time, however, it is often required that control of interconnections be available from some point other than that at the board itself.

The object of this invention is, therefore, to provide a means whereby the switch, located at one point, may be rapidly and positively positioned from another, without impairing the ability of the switch to be positioned locally.

This and other objects of the invention will be made apparent from the specification to follow and from the attached drawings, it being distinctly understood that the specification and drawings are intended to illustrate rather than to limit and define the scope of the invention, reference being made to the appended claims for that purpose.

Figure 2:
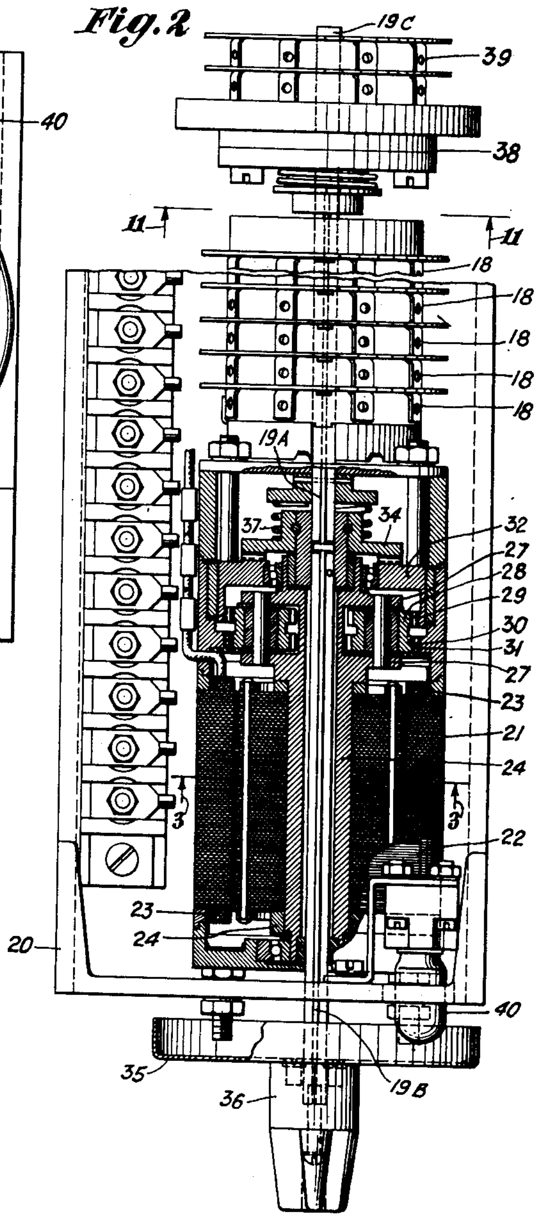
Fig. 2 is a plan view of an assembled device, partly in section.
Figure 3:
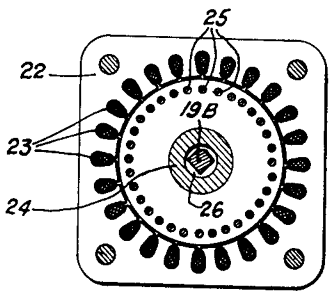
Fig. 3 is a cross section view of the driving motor on the line 3—3 of Fig. 2.

As shown in Fig. 2, the assembled unit consists of a rotary switch comprising a plurality of sections 18, each having an outer stationary ring of contacts and an inner rotatable wiping element, as is common to most rotating switches such as the JR type used by the Navy, and having the rotors driven by a common shaft 19A. Co-axial therewith and mounted on the base 20 is the motor 21. Motor 21 is specially wound, its stator 22 requiring three-phase power and producing eight poles, the winding 23 having one slot per pole per phase. The rotor 24 has a ratio of resistance to reactance such as to produce maximum starting torque, and has thirty-two bars 25 embedded therein and welded to end rings in the usual squirrel-cage manner.

The rotor 24 is hollow, having an opening 26 extending completely therethrough and is terminated in a spider 27 holding the planet gears 28. The planet gears 28 have two sets of teeth 29 and 30 differing in number by one. The larger set 30 meshes with and runs against sun gear 31 which is stationary and set into the motor frame. The smaller set 29 drives gear 32 to thus achieve a very great reduction in speed while at the same time occupying a minimum of space and maintaining the rotor of the motor and the output shaft 19A in alignment.

A shaft 19B extends through the motor rotor and is made fast at one end to the clutch plate 34 and at the other to the dial 35 and knob 36. The spring 37 urges the clutch plate 34 into tight contact with gear 32 so that, when driven by the motor 21, the clutch rotates with the gear 32 as a unit. The shaft 19A is also fastened to clutch plate 34 so that when driven by the motor it, too, is made to rotate and thus to turn and position the sections 18 and thus select the desired switch function as well as the detent 38 and control switches 39, which elements are hereinafter described.

Should it be desired, however, to position the switch manually, axial pressure on knob 36 sufficient to overcome the force of spring 37 will cause the clutch plate 34 to release gear 32 and the switch may then be rotated to any desired position whether or not the motor be running, idle or disabled. Upon releasing the knob 36, the spring 37 will return the clutch to its original position making automatic operation again instantly available.

Figure 1:
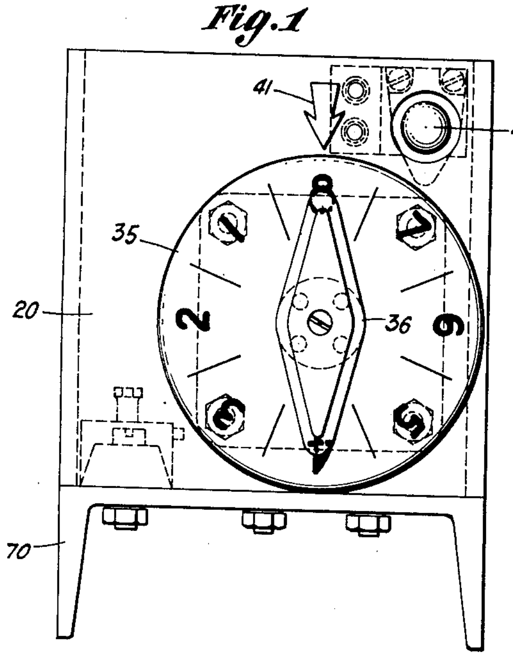
Fig. 1 is a front view of the device.

As shown in Fig. 1, the dial 35 and knob 36 as well as an indicator lamp 40 and an index 41 are used to indicate when the device is in motion or at what position it is standing.

Figure 4:
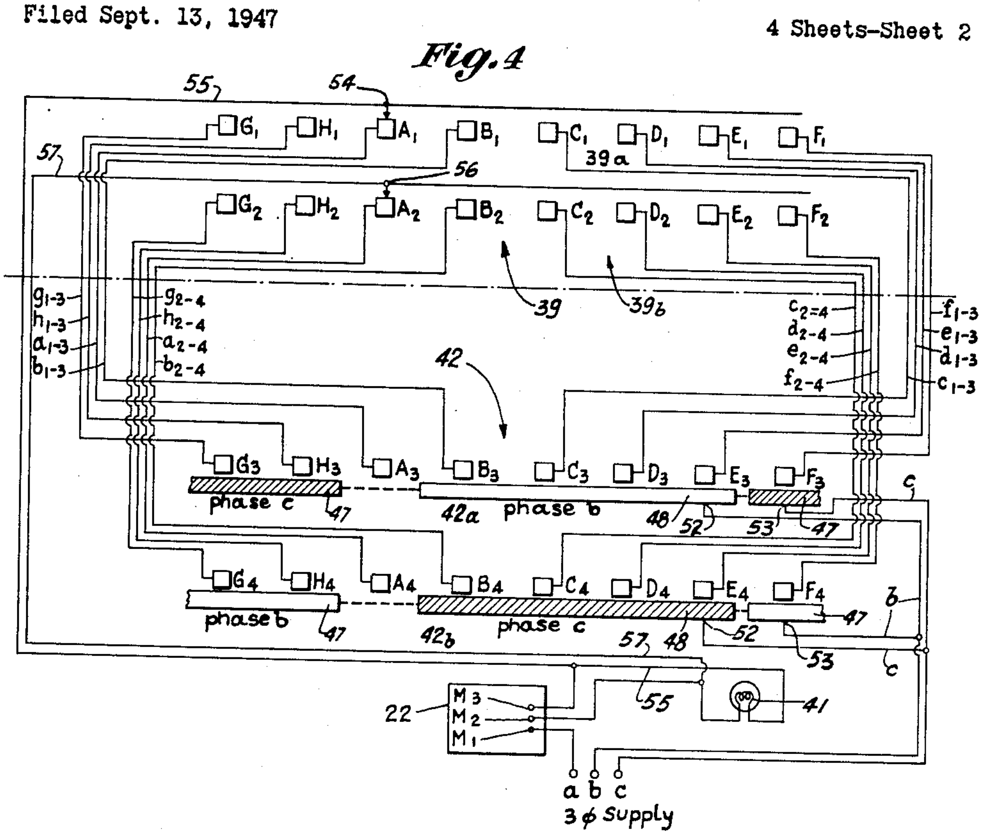
Fig. 4 is a circuit diagram showing the motor and controller interconnections.
Figure 6:
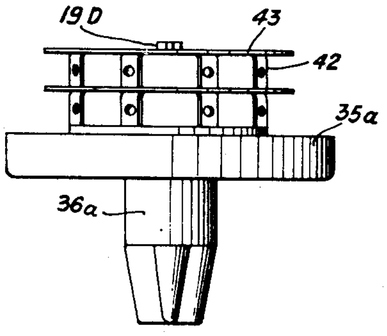
Fig. 6 is a plan view of the controller.

A controller 42 for the automatic switching circuit of Fig. 4 is at some point remote from the switch and requires an eighteen-conductor cable to interconnect it with the motor driven switch. In Fig. 6, which illustrates the assembly of the control elements shown in Fig. 4, the controller is shown as comprising a knob 36*a*, a shaft 19*d* and dial 35*a* similar to those shown in Fig. 2. They are illustrated as unmounted. An index, not shown, similar to index 41, Fig. 1, would be mounted thereon and, if required, an indicator such as 40, Fig. 1, might be employed.

Figure 9:
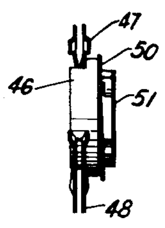
Fig. 9 is a side view of the rotor shown in Fig. 8.
Figure 8:
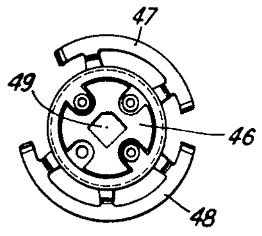
Fig. 8 is a front view of the rotor of the controller switching element.
Figure 7:
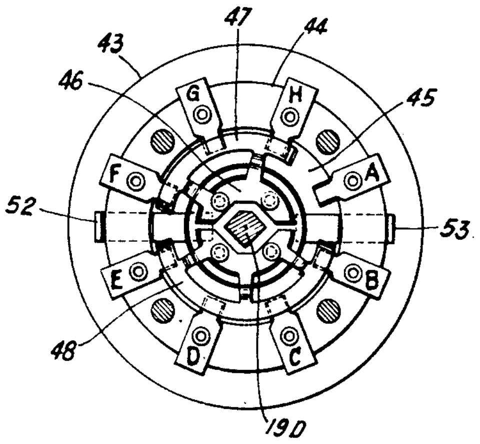
Fig. 7 is a front view of the controller switching element.

The wafers 43, Fig. 6, are shown in detail in Fig. 7, and comprise a rim of some dielectric material upon which is mounted a ring 44 to which are united, at intervals of 45°, contacts A to H of some conducting material. In the central opening 45 into which the contacts project is a rotor 46 which is illustrated in detail in Figs. 8 and 9.

The rotor 46 carries two contacts 47 and 48, contact 47 being shorter and subtending an angle of about 100°, and contact 48 being longer and subtending an angle of 145°, said contacts being so spaced with respect to each other as to leave two gaps of 30° and 80° between their ends. Thus as shown in Fig. 7, rotor contact 47 connects stator contacts F, G and H together and rotor contact 48 connects B, C, D and E together, leaving stator contact A free. The rotor 46 has a central opening 49 through which the shaft 19*d* is passed and which serves to turn the rotor within the stator.

The rotor has two conducting rings 50 and 51 which are connected to the contacts 47 and 48 respectively, which when assembled into a unit with the stator, are contacted by the brushes 52 and 53 so that all of the stator contacts held by the rotor contact may be connected by a conducting path to an outside source.

Figure 5:
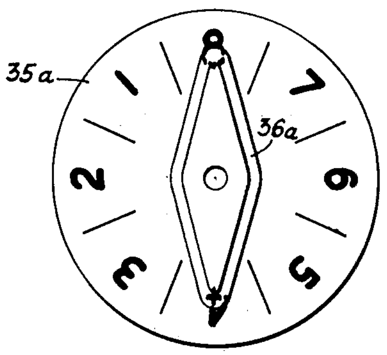
Fig. 5 is a front view of the controller.

Shown as 42, Fig. 4, two such elements comprise the control unit, the units being shown schematically developed, rather than pictured as in Figs. 5, 6 and 7.

These control elements are identical to the wafers of the switch to be driven, shown in Fig. 2 as 18, with the exceptions that the rotor contacts a group of stator contacts rather than one at a time. The driven switch contacts are short so that only one stator contact at a time is conductively coupled to the rotor contact and only one brush such as 47 or 48 is required.

Two regular switch sections are set aside as part of the control mechanism and are separately designated in Figs. 2 and 4, as 39.

The control sections 39 are coupled to an extension of shaft 19*a* by the snap action detent 38 which is hereinafter described in detail, whose purpose it is to convert the constant rotary motion of shaft 19*a* into an intermittent motion of 45° steps on shaft 19*c*.

Referring to Fig. 4, control is then effected as follows: One lead *a* of the three phase source *a*, *b*, *c* is connected directly to motor 22 at terminal $M_1$, and the remaining phases, *b* and *c*, are connected to the control switch sections 42, phase *b* being connected to terminal 52 of section 42*a* and 53 of section 42*b* and phase *c* to terminal 51 of section 42*a* and 52 of 42*b*.

The stator contacts are connected by means of an eighteen-conductor cable to the section 39 which is on the switch, so that the terminal $G_1$ thereof is connected to $G_3$ of the control section by lead $g_{1-3}$, etc. Using the double subscript notation for the interconnection, the eighteen connections become:

Lead $a_{1-3}$ connects terminal $A_1$ on 39 to terminal $A_3$ on 42

Lead $a_{2-4}$ connects terminal $A_2$ on 39 to terminal $A_4$ on 42

Lead $b_{1-3}$ connects terminal $B_1$ on 39 to terminal $B_3$ on 42

Lead $b_{2-4}$ connects terminal $B_2$ on 39 to terminal $B_4$ on 42

Lead $c_{1-3}$ connects terminal $C_1$ on 39 to terminal $C_3$ on 42

Lead $c_{2-4}$ connects terminal $C_2$ on 39 to terminal $C_4$ on 42

Lead $d_{1-3}$ connects terminal $D_1$ on 39 to terminal $D_3$ on 42

Lead $d_{2-4}$ connects terminal $D_2$ on 39 to terminal $D_4$ on 42

Lead $e_{1-3}$ connects terminal $E_1$ on 39 to terminal $E_3$ on 42

Lead $e_{2-4}$ connects terminal $E_2$ on 39 to terminal $E_4$ on 42

Lead $f_{1-3}$ connects terminal $F_1$ on 39 to terminal $F_3$ on 42

Lead $f_{2-4}$ connects terminal $F_2$ on 39 to terminal $F_4$ on 42

Lead $g_{1-3}$ connects terminal $G_1$ on 39 to terminal $G_3$ on 42

Lead $g_{2-4}$ connects terminal $G_2$ on 39 to terminal $G_4$ on 42

Lead $h_{1-3}$ connects terminal $H_1$ on 39 to terminal $H_3$ on 42

Lead $h_{2-4}$ connects terminal $H_2$ on 39 to terminal $H_4$ on 42

Lead 55 connects terminal 54 on 39 to terminal $M_3$ on 42

Lead 57 connects terminal 56 on 39 to terminal $M_2$ on 42

With the connections as indicated contact 48 of control section 42*a* carries phase *b* and 47 carries phase *c* and this is reversed on control section 42*b* so that $B_3$, $C_3$, $D_3$, $E_3$, $F_4$, $G_4$ and $H_4$ carry phase *b* and $B_4$, $C_4$, $D_4$, $E_4$, $F_3$, $G_3$ and $H_3$ carry phase *c*. The interconnecting leads will then cause the wafers 39*a* and 39*b* to have a corresponding distribution of phases $B_1$, $C_1$, $D_1$, $E_1$, $F_2$, $G_2$ and $H_2$ carrying phase *b* and $B_2$, $C_2$, $D_2$, $E_2$, $F_1$, $G_1$ and $H_1$ carrying phase *c*.

Contacts $A_3$ of 42*a* and $A_4$ of 42*b* are not connected to a rotor contact and hence not connected to any source of power, consequently contacts $A_1$ of 39*a* and $A_2$ of 39*b* are not connected to any source of power.

The rotor contacts 54 and 56 of wafers 39*a* and 39*b* are connected by way of leads 55 and 57 to the remaining terminals $M_3$ and $M_2$ and to the pilot light or indicator 41. With these contacts positioned so that they fall upon $A_1$ and $A_2$, two power leads to the motor are dead, the pilot light is out and the motor will not run.

If, however, by means of knob 36*a*, the rotors of 42*a* and 42*b* were turned to any other point of contact $A_3$ and $A_4$ would supply energy and, since there are two possibilities, they shall be discussed in order.

First, rotors 42*a* and 42*b* may be moved by means of knobs 33*a* clockwise, so that the contacts $C_3$ and $C_4$ are not engaged by 42*a* or 42*b*. Phase *b* would then be applied to $D_3$, $E_3$, $F_3$, $G_3$, $H_4$, $A_4$ and $B_4$ and phase *c* would be applied to $D_4$, $E_4$, $F_4$, $G_4$, $H_3$, $A_3$ and $B_3$. The connections between $A_4$ and $A_2$, lead $a_{2-4}$, and $A_3$ and $A_1$, lead $a_{1-3}$, would put phase *b* on $A_2$ and phase *c* on $A_1$ and leads 55 and 57 would bring the power to the motor 22 and lamp 41. The lamp would glow and the motor would start, and run clockwise with the phase sequence to its terminals $M_1$—*a*, $M_2$—*b*, and $M_3$—*c*.

After turning the shaft and switches through 45° the contacts 54 and 56 would jump under the action of detent 38 and be positioned on $B_1$ and $B_2$. Since $B_1$, by way of lead $b_{1-3}$, and $B_2$, by way of lead $b_{2-4}$, and the rotors of 42*a* and 42*b* are effectively in parallel the motor will continue to run and turn shaft 19C through another 45°. At this point the detent 38 will position the rotors of switch wafers 39 on contacts $C_1$, and $C_2$ which by way of leads $c_{1-3}$ and $c_{2-4}$ are connected to contacts $C_3$ and $C_4$. Since $C_3$ and $C_4$ carry no power, the power will stop in leads 55 and 57 and motor 22 and pilot lamp 41 will cease to function.

In running, all of the wafers 18 will be driven simultaneously by shaft 19*a* and the circuit functions controlled by the index selectioned will be established.

If the rotors 42*a* and 42*b* had been moved counterclockwise so that the contacts $G_3$ and $G_4$ are not engaged by rotors 42*a* and 42*b*, phase *b* would be applied to contacts $H_3$, $A_3$, $B_3$, $C_3$, $D_4$, $E_4$ and $F_4$ and phase *c* would be applied to contacts $H_4$, $A_4$, $B_4$ $C_4$, $D_3$, $E_3$ and $F_3$. The connections between $A_4$ and $A_2$ by means of lead $a_{2-4}$ and $A_3$ and $A_1$ by means of lead $a_{1-3}$ would put phase *b* on A, and phase *c* on $A_2$ and leads 55 and 57 would bring the power to motor 22 and lamp 41. The lamp would glow and the motor would start and run counterclockwise with the phase sequence to its terminals $M_1$—*a*, $M_2$—*c* and $M_3$—*b*.

After turning the switch through 45° the contacts 54 and 56 would jump under the action of the detent 38 and be positioned on $A_1$ and $A_2$. Since $H_1$, by way of lead $h_{2-3}$, and $H_2$, by way of lead $h_{2-4}$, and the rotors 42*a* and 42*b* are effectively in parallel, the motor will continue to run and turn shaft 19*a* through another 45°. At this point the detent 38 will position the rotors of switch wafers 39 on contacts $G_1$ and $G_2$, which, by way of leads $g_{1-3}$ and $g_{2-4}$, are connected to contacts $G_3$ and $G_4$. Since $G_3$ and $G_4$ carry no power, the power will stop in leads 55 and 57 and motor 22 and pilot lamp 41 will cease to function.

Again, in running, all of the wafers 18 will be driven simultaneously by shaft 19*a* and the circuit functions controlled by the selected index will be established. In every case, the motor will follow the controller in direction of rotation, at least to begin with, and will always seek to position the wafers 18 by the shortest possible route.

Proper operation of the automatic drive is dependent in a very large measure upon the behavior of switch sections 39*a* and 39*b*. Although the motor 22, and therefor shaft 19*a*, rotates continuously, it is necessary that the transfer of the rotor contacts 54 and 56 be made as rapidly as possible in discrete steps and without over-travel from stator contact to stator contact.

The function of converting the continuous rotary motion of shaft 19*a* into intermittent motion in steps of 45° on shaft 19*c* is performed by the detent or indexing mechanism 38.

Figure 11:
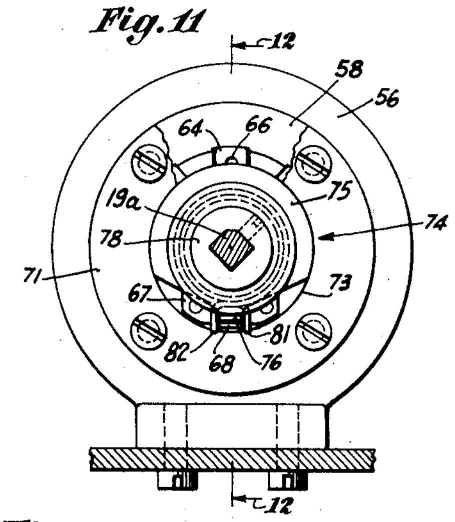
Fig. 11 is a section on the line 11—11 of Fig. 2 showing, in front elevation, the snap action control element associated with the switch.
Figure 16:
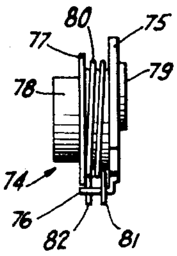
Fig. 16 is a side view thereof.
Figure 17:
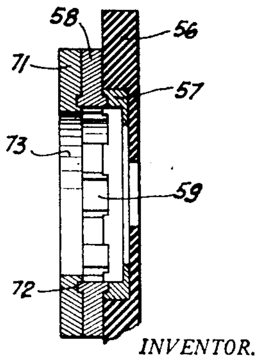
Fig. 17 is a partial sectional view of the snap action assembly.

Referring to Figs. 11 to 17, the detent 38 shown in Fig. 11 comprises a supporting member 56 within which there is recessed a stepped ring 57 (Fig. 17). A latch ring 58 having inwardly extending teeth 59 is nested into a groove of the ring 57, as shown in Fig. 17.

A driven member in the form of a disc 60 is keyed to the shaft 19*c* and has a radially extending slot 61 therein which extends almost but not completely across its face, with a pin 62 at its inner end. Said disc 60 is nested in openings of the rings 57 and 58 so that it is free only to rotate therein. The slot 61 receives the detent 64 for sliding movement therein and, by mounting a coil spring 63 on the pin 62 and in a recess 65 in the inner end of said detent, the latter is normally urged outwardly in a radial direction so that its outer end will engage between teeth 59 on the ring 58, and thereby lock said disc 60 against rotation within the ring 58.

An angular member 67 secured to the face of the disc 60 is located adjacent the inner end of the slot 61 and is provided with a projection 68 by which said disc 60 may be rotated when the detent 64 is moved inwardly to disengage itself from the teeth 59. Said detent is further provided with a longitudinal slot 66 adjacent its outer end which receives a pin 69 carried by a ring 70 whereby the latter has both a pivotal and sliding connection with said detent for a purpose which will presently appear.

Figure 15:
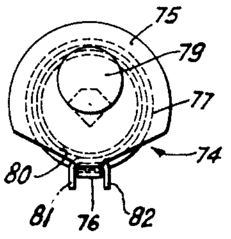
Fig. 15 is a front view of the driving member of the snap action control element.

A cover plate 71 has a groove 72 on its inner surface to receive a flange of the ring 58, and also has an opening 73 therein smaller in diameter than the disc 60 so that when said plate is in position it restrains said disc within the assembly and provides a space in which the driving unit 74, shown in Figs. 15 and 16, may rotate.

The plate 75 of the unit 74 is substantially of disc-like formation to permit its rotation but not its radial displacement in the opening 73 of the cover plate 72, and is provided at the reduced portion thereof with a projection 76 bent at right angles to the plate and designed to cooperate with the projection 68, as will presently appear. On the inner side of plate 75, the same is provided with an eccentrically disposed circular projection 79 whose eccentricity is a function of the slot depth between adjacent teeth 59, and whose diameter is such as to fit the opening in the ring 70. In addition to the plate 75 and its projection 79, the unit 74 further comprises a hub portion 78 having an intermediate annular flange 77, and said portion 78 is further provided with an axial opening for receiving an end of the shaft 19*a* so that said unit will turn with the shaft. Coiled about that section of the hub portion 78 between the plate 75 and the flange 77, is a torsion spring 80 which terminates in free extremities 81, 82 that straddle the projection 68 on the disc 60 and the projection 76 on the plate 75, and said spring is so wound that separation of said extremities 81, 82 increases the tension thereof. The assembled unit 74 is inserted into the opening 73, with the projection 79 fitting into the ring 70 and the spring ends 81, 82 straddling the projections 68 and 76.

Figure 12:
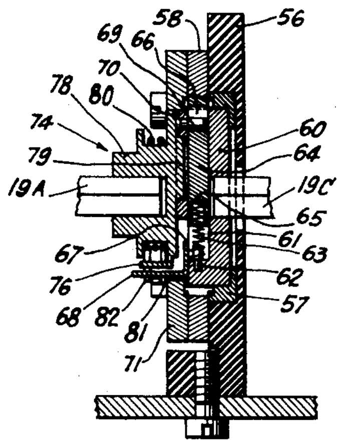
Fig. 12 is a section taken along the line 12—12 of Fig. 11.
Figure 13:
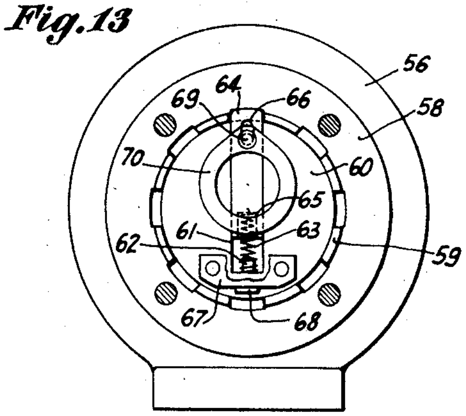
Fig. 13 is a front view, partly disassembled, of the snap action control element.
Figure 14:
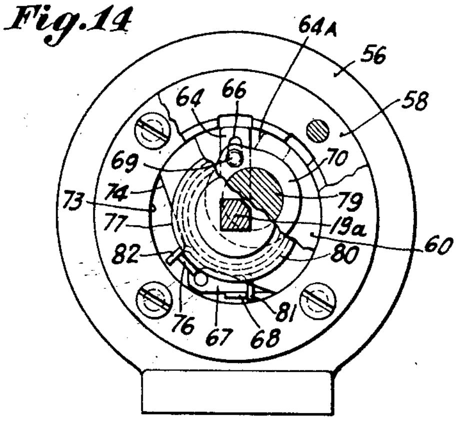
Fig. 14 is a front view, partly broken away and shown in section, of the snap action control element.

With the shaft 19*a* being driven at a constant angular velocity, the eccentric element 79 will cause the ring 70 to turn about its pivot 69. The distances from the center of rotation of said shaft to the center of the eccentric 79 and from there to the pin 69 being fixed, the effect of the movement of the eccentric upon the ring 70 will be to cause the latter to withdraw the detent 64 inwardly against the tension of the spring 63 until said detent clears the teeth 59 in the ring 58. During this rotation, the projections 68 and 76 which, at the beginning of the cycle were aligned as shown in Fig. 12, will be separated rotationally as shown in Fig. 14. The detent 64 at this point, will have been withdrawn to where it almost clears said teeth, the spring 80 will have been tensioned by the separation of its extremities 81, 82, but the disc 60 will not have been moved since the detent is not entirely disengaged from said teeth. With continued rotation, the detent 64 will clear said teeth and, now free of restraint and urged by the tension of the spring 80 against the projection 68, the disc 60 will rotate with a snap action until said detent again aligns itself with the next succeeding space between teeth 59 on said ring 58, whereupon the spring 63 will again urge the detent outwardly into said space and the disc 60 will again come to rest. The shaft 19*c*, being keyed to the disc 60, will turn with a similar step-by-step motion and the contacts 54 and 56 of the switch wafers 39*a* and 39*b* will also have imparted thereto a similar intermittent motion.

Figure 10:
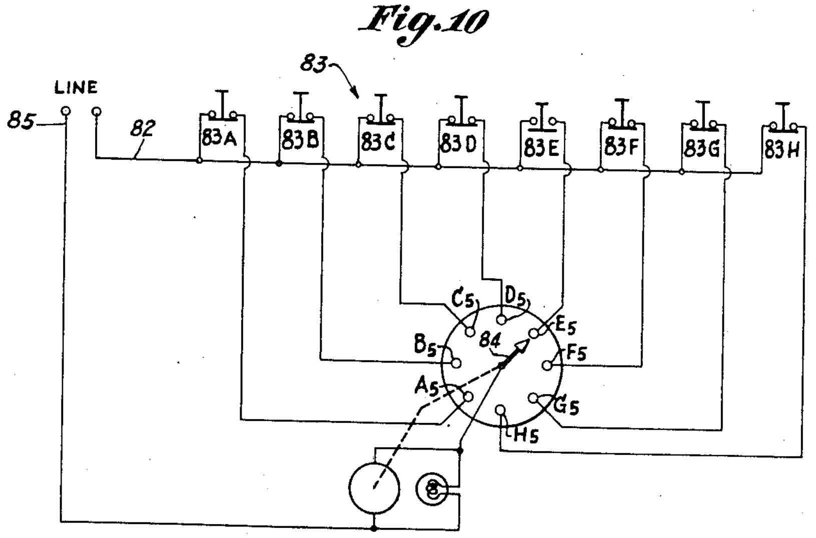
Fig. 10 is a circuit diagram showing another mode of interconnection between the motor and controller.

Another version of the switch device is shown in Fig. 10 wherein similar elements are utilized in a uniphase rather than a polyphase application.

In this application, one side of the line is brought to a motor and switch such as shown in Fig. 2. In this embodiment, it is necessary that the motor be self-starting. The line 82 is connected in series with the push button switch generally indicated at 83 and a contact $E_5$ through rotor 84 to the other side of the motor 22 and lamp 41 to line 85.

Switch 83 comprises eight push buttons, $83_A$, $83_B$ . . . etc., operating with seven normally closed and one normally open contact, and controlled by a latch bar (not shown) so that the opening of any one switch by pushing the button associated therewith closes all of the remaining switches. Thus, contact $83_A$ connects to contacts $A_5$, $83_B$ to $B_5$, etc., and since all of the contacts on said switch are closed but one, unless the rotor 84 carried by the shaft 19*c* rests on the contact connected to a contact on 83 which is open, the motor will run until the rotor 84 is carried around to the particular contact which is not energized, whereupon the motor will stop.

If contact $83_D$ were opened, the latch bar would close contact $83_E$ and the circuit of the motor would thereupon be completed through contacts $E_5$ and 84. The motor would start to run, contact 40 would engage in turn, in the step-by-step manner hereinbefore outlined, contact $83_F$ corresponding to $F_5$, $83_G$ corresponding to $G_5$, $83_H$ corresponding to $H_5$, $83_A$ corresponding to $A_5$, $83_B$ corresponding to $B_5$ and $83_C$ corresponding to $C_5$, all of which are, in turn, energized from the line. Upon being centered on contact $83_D$, however, the circuit is broken by the fact that contact $83_D$ is open and the motor would cease to run, the switch would be positioned and the desired circuits on the wafers 18 would be established.

What is claimed is:

1. In a device to selectively operate a plurality of external circuits, the combination with a multi-contact positionable switch having a plurality of selectable positions with each position common to one combination of said external circuits, and a shaft for operating said switch; of a selector switch having a like plurality of selectable positions, stationary contacts for said selector switch at each of said selectable positions, spaced and opposed movable contacts each engageable with a series of said stationary contacts less than the total number thereof, said movable contacts being so arranged that the contacts at all but one of said selectable positions will be engaged thereby in any position of said movable contacts, and being adapted for connection to two phases of a three phase power source, a control switch having a like plurality of positions corresponding to the positions of said selector switch, fixed contacts at each of said positions, movable contacts for said control switch contacting said fixed contacts thereof at one position at a time, said movable contacts being operated by said shaft for operating said multi-contact switch and being adapted for connection to two phases of a three phase motor, circuit connections between each of the fixed contacts of said selector switch and the fixed contacts of said control switch, a three phase electric motor having two phases thereof connected to said movable contacts of said control switch and the remaining phase to the unused phase of said power source, and means for coupling said motor to said shaft.

2. In a device to selectively operate a plurality of external circuits, the combination with a multi-contact positionable switch having *n* selectable positions with each position common to one combination of said external circuits, and a shaft for operating said switch; of a selector switch having a like number of *n* selectable positions, stationary contacts for said selector switch at each of its positions, movable contacts for said selector switch, said movable contacts being arranged in pairs contacting two groups of $$\left[\frac{n-1}{2}\right]$$

of said stationary contacts when *n* is odd and a group of $$\left[\frac{n-1}{2}+\frac{1}{2}\right]$$

and another of $$\left[\frac{n-1}{2}-\frac{1}{2}\right]$$

when *n* is even, each of said movable contacts being adapted for connection to one of two phases of a three phase power source, means for positioning said movable contacts so that the stationary contacts corresponding to a selectable position of said selector switch are disengaged from said moving contacts, a control switch having a like number of *n* positions corresponding to the *n* positions of said selector switch, stationary contacts for said control switch at each of said *n* positions, movable contacts for said control switch contacting the fixed contacts thereof at one position at a time, said latter movable contacts being operated by said shaft for operating said multi-contact switch and being adapted for connection to two phases of a three phase motor, circuit connections between each of the fixed contacts of said selector switch and the fixed contacts of said control switch, a three phase electric motor having two phases thereof connected to said moving contacts of said control switch and the remaining phase to the unused phase of the three phase power source, and means for coupling said motor to the shaft positioning means of said multi-contact switch and said control switch.

3. In a device to selectively operate a plurality of external circuits, the combination with a multi-contact positionable switch having *n* selectable positions with each position common to one combination of said external circuits, and a shaft for operating said switch; of a selector switch having *n* selectable positions, a pair of stationary contacts for said selector switch at each of said *n* selectable positions, a pair of movable contacts for said selector switch, said movable contacts each being arranged in an opposed pair contacting two groups of $$\left[\frac{n-1}{2}\right]$$

of said stationary contacts when $n$ is odd and a group of $$\left[\frac{n-1}{2}+\frac{1}{2}\right]$$

and of $$\left[\frac{n-1}{2}-\frac{1}{2}\right]$$

when $n$ is even and each being adapted for connection to one of two phases of a three phase power source so that the pairs of contacts contacted thereby are connected to differing phases, means for positioning said movable contacts so that the pair of stationary contacts corresponding to a selectable position of said selector switch are disengaged from said moving contacts, a control switch having a like plurality of $n$ positions corresponding to the $n$ positions of said selector switch, stationary pairs of contacts at each of said $n$ positions, a pair of movable contacts for said control switch for contacting said pairs of fixed contacts thereof at one position at a time, said movable contacts being mounted for operation upon the shaft means for operating said multi-contact switch and being adapted for connection to two phases of a three phase motor, circuit connections between each of the fixed contacts of the selector switch and the corresponding fixed contacts of said control switch, a three phase electric motor having two phases thereof connected to said moving contacts of said control switch and the remaining phase to the unused phase of the three phase power source, and means for coupling said motor to the shaft positioning means of said multi-contact switch and said control switch.

EDWARD LOHSE.

REFERENCES CITED

The following references are of record in the file of this patent:

UNITED STATES PATENTS

| Number | Name | Date |
|---|---|---|
| 1,411,269 | Couwenhoven | Apr. 4, 1922 |
| 1,956,419 | Garrett | Apr. 24, 1934 |
| 2,085,442 | Newell | June 29, 1937 |
| 2,164,633 | Barrett | July 4, 1939 |
| 2,270,176 | Van Lammern et al. | Jan. 13, 1942 |
| 2,408,274 | Schleicher | Sept. 24, 1946 |